United States Patent
Leite et al.

(10) Patent No.: US 7,416,780 B2
(45) Date of Patent: Aug. 26, 2008

(54) FLAME-RETARDANT COMPOSITION COMPRISING ORGANOPHOSPHORUS COMPOUND IMPREGNATED ON A POROUS SUPPORT, PREPARATION METHOD AND USE THEREOF

(75) Inventors: Lorraine Leite, Paris (FR); Jean-Emile Zanetto, Paris (FR); Alexis Ponnouradjou, Paris (FR); André Lambert, Reventin Vaugris (FR)

(73) Assignee: Rhodia Chimie, Aubervilliers (FR)

( * ) Notice: Subject to any disclaimer, the term of this patent is extended or adjusted under 35 U.S.C. 154(b) by 256 days.

(21) Appl. No.: 10/523,420

(22) PCT Filed: Aug. 1, 2003

(86) PCT No.: PCT/FR03/02444

§ 371 (c)(1),
(2), (4) Date: Sep. 22, 2005

(87) PCT Pub. No.: WO2004/015016

PCT Pub. Date: Feb. 19, 2004

(65) Prior Publication Data

US 2006/0100325 A1    May 11, 2006

(30) Foreign Application Priority Data

Aug. 2, 2002  (FR) .................................... 02 09886
Jun. 27, 2003  (FR) .................................... 03 07813

(51) Int. Cl.
B32B 3/26    (2006.01)
C09K 21/02   (2006.01)
C09K 21/12   (2006.01)

(52) U.S. Cl. .............. 428/307.3; 428/318.4; 428/321.1; 428/403; 428/920; 252/601

(58) Field of Classification Search ................. 428/920, 428/921, 304.4, 307.3, 318.4, 321.1, 403; 252/601

See application file for complete search history.

(56) References Cited

U.S. PATENT DOCUMENTS

| | | | | |
|---|---|---|---|---|
| 4,107,376 A * | 8/1978 | Ishikawa | .................. | 428/305.5 |
| 4,233,199 A * | 11/1980 | Abolins et al. | .............. | 524/139 |
| 4,254,177 A * | 3/1981 | Fulmer | .................... | 428/305.5 |
| 4,554,394 A * | 11/1985 | Forbus et al. | ................ | 585/474 |
| 5,721,281 A * | 2/1998 | Blount | ........................ | 521/50 |
| 5,952,408 A * | 9/1999 | Lee et al. | ..................... | 524/127 |
| 6,160,028 A * | 12/2000 | Dyer | ........................... | 521/64 |
| 6,723,378 B2 * | 4/2004 | Hrubesh et al. | ............. | 427/180 |
| 6,827,984 B2 * | 12/2004 | Slimak et al. | ............ | 427/397.7 |
| 2005/0143503 A1 * | 6/2005 | Bauer et al. | ................. | 524/115 |
| 2005/0272839 A1 * | 12/2005 | Bauer et al. | ................. | 524/115 |

* cited by examiner

*Primary Examiner*—H. T Le
(74) *Attorney, Agent, or Firm*—Buchanan, Ingersoll & Rooney, PC

(57) ABSTRACT

The present invention relates to a new flame-retardant composition based on a flame retardant impregnated on an inorganic oxide of high porosity, to a process for preparing it and to its use for flame retarding materials and especially polymers.

21 Claims, No Drawings

FLAME-RETARDANT COMPOSITION COMPRISING ORGANOPHOSPHORUS COMPOUND IMPREGNATED ON A POROUS SUPPORT, PREPARATION METHOD AND USE THEREOF

This application is an application under 35 U.S.C. Section 371 of International Application Number PCT/FR2003/002444 filed on Aug. 01, 2003.

The present invention relates to a new flame-retardant composition based on a flame retardant impregnated on a porous support such as an inorganic oxide of high porosity, to a process for preparing it and to its use for flame-retarding materials and especially polymers.

The flame retardancy treatment of polymers is commonly carried out with flame retardants in solid form, since they are easy to incorporate into the polymer.

Indeed the use of a liquid flame retardant necessitates the use of pumps. This difficulty of implementation is increased still further if the flame retardant to be used is in the form of a viscous liquid. In that case it is then necessary, indeed, to provide a system for heating the container holding the flame retardant, the feed and discharge pipes and the pump that is used. Moreover, the mixing of a liquid compound into a high-viscosity medium such as polymers in the melted state is an elaborate operation, particularly in order to obtain homogeneous dispersion of the liquid compound. These difficulties in implementing flame-retardant liquid compounds have greatly limited their use, despite the promise of their performance and flame retardancy capacity.

The addition of flame retardant additives to the polymers is carried out either directly, by adding the flame retardant, which is generally solid, to the melted polymer, or by the use of mixtures in the form of masterbatches or concentrates. These mixtures are obtained by prior mixing of a sizeable amount of the flame retardant into a matrix, which may be identical to the polymer to be rendered flame retardant or a polymer which allows the flame retardant to be dispersed more effectively. The masterbatch is shaped in the form of extruded granules or pellets, for example. Thus the addition of red phosphorus, a compound which is employed for flame retarding polyamides, is carried out via masterbatches which are sold under the trade name Masterflam by Italmatch or Novomasse by Rhone-Poulenc.

However, the problems of dispersing the flame retardant additive in the masterbatch are still present with the liquid compounds.

Moreover, it is difficult to produce a masterbatch in compact form with a liquid flame retardant, since the principle of the compact masterbatch is to adhere fine and dusty powders to the polymer powder (PA6, for example) by means of a substance which is fusible under the operating conditions and which subsequently provides, by solidifying on cooling, for the integrity, non-dusting character and ready flowability of the pellets obtained.

It is also difficult to produce a milled masterbatch with a liquid flame retardant. Moreover, when the polymer selected as vehicle and the flame retardant are not miscible, mixing them leads to a two-phase dispersion which is very difficult to handle, for reasons of rheology, thereby limiting the flame retardant concentration of the masterbatch.

Proposals have also been made to produce polymer sponges which are subsequently impregnated by the liquid flame retardant. These polymer sponges may be obtained, for example, by injecting an inert gas such as Freon into the melted polymer, such as the Acurel products sold by Akzo.

This solution, however, is inconvenient. Moreover, the impregnation remains an elaborate operation when the flame retardant is a viscous liquid.

The need therefore exists to find a means of incorporating a liquid flame retardant, and in particular a viscous liquid flame retardant, into polymers which does not present these drawbacks.

Furthermore, certain flame retardants, especially phosphorus-based flame retardants such as phosphoric esters or phosphonic esters, may give rise to problems of stability and/or of chemical reactivity towards the polymers into which they are introduced, depending on the introduction conditions and at the temperatures at which the polymers are shaped.

This is the case in particular with the majority of phosphoric esters or phosphonic esters, which, when they are introduced as they are into polyamide under extrusion conditions at a temperature of between 280 and 350° C., or in the course of the subsequent conversion of the moulding powders obtained by injection or any other process, give rise to an increase in the viscosity index of the polyamide, which can go as far as to solidification.

Mention may be made in particular of phosphorus-based liquid flame retardants such as phosphonic acids and their esters and salts, phosphoric esters or phosphinic acids and their esters and salts.

The need exists to find a means of incorporating a flame retardant based on phosphorus and in particular phosphoric esters or phosphonic esters into polyamide without modification of the polyamide under the conditions of extrusion or of conversion of the products obtained.

Furthermore, certain flame retardants may give rise to problems of excessively low activation temperature relative to the degradation temperature of the polymer under the effect of a flame, or else may be active for too short a time. By activation temperature is meant the temperature at which the flame retardancy property of the additive is developed either, for example, by decomposition or by reaction with the matrix or another compound in the composition.

The need exists to find a means of modulating the activation temperature and/or the time of action of the flame retardant.

The aim of the invention is to provide a remedy in particular for the drawbacks indicated above, by providing a solution which allows in particular liquid flame retardants and more particularly still phosphorus flame retardants to be used for flame retarding polymers.

These aims and others are achieved by the present invention, which accordingly first provides a new flame-retardant composition comprising a flame retardant impregnated on a porous solid support, characterized in that that the surface of the porous support is hydrophilic or hydrophobic in nature, the organophosphorus compound having a hydrophilic or hydrophobic nature equivalent to the said surface of the porous compound.

According to one feature of the invention the liquid flame-retardant agent or compound is advantageously other than orthophosphoric acid or polyphosphoric acid. By impregnation is meant that the flame-retardant compound is bonded at least temporarily to the solid substrate by any type of bonding such as absorption in the porous structure of the particle, if such a structure exists, wetting or adsorption of the flame-retardant compound on the surface of the particles by at least one layer of the flame-retardant compound, or fixing or grafting of the flame-retardant compound on the surface of the particles by chemical or physico-chemical bonds.

Such adsorption or fixing is thus facilitated by the selection of a solid substrate which has surface properties which are compatible with the properties of the flame-retardant compound. For example, a substrate having hydrophilic surface properties is advantageously combined with a flame-retardant compound which is hydrophilic in nature, and conversely for the compounds which are hydrophobic in nature.

Furthermore, the particle of the solid substrate may advantageously comprise elements and/or free radicals which promote the adsorption of the flame-retardant compound on the surface of the said particle.

The new flame-retardant composition of the invention has the advantage of being easy to handle and easy to incorporate into the materials which must be rendered fire resistant, while retaining effective flame retardancy performance.

By fire resistance is meant primarily the property of extinction and of non-spreading of combustion of the article. This property is illustrated in particular by standardized tests as, for example, for measuring this property on moulded articles, the test called "UL94" (Underwriters Laboratories), or, for textile articles, which is to say woven, knitted, tufted, flocked or nonwoven surfaces, tests such as that described in standard EN533, standard NF G07-128 of December 1978, standard ADB0031, published on 22 Feb. 2001, standard AITM 2.0007 B, standard AITM 2.0003 or the standards NF P92.504/501/503/507, which are applicable in particular in the construction sector.

Furthermore, this new flame-retardant composition, when based on phosphorus and in particular on phosphoric, phosphonic or phosphinic esters, can be used for flame-retarding polymers and particularly polyamide, polyester and more generally polymers requiring a high temperature to shape and produce articles, such as for example a temperature above 200° C. Thus, with the composition of the invention, the processes for shaping polymers may be carried out at such temperature levels without any substantial interaction being observed on the properties of the polymer, such as, for example, its breakdown or solidification. This result is of great interest, since, when such a flame retardant is introduced directly, for example into polyamide, in the processes of extrusion or injection, an increase occurs in the degree of polymerization of the polymer, leading to solidification, which thus prevents any utilization of a polyamide composition of that kind. With polyesters, a degradation of the polymer preventing also the use of these flame retardants is observed. Moreover, this new flame-retardant composition has an activation temperature and/or a duration of action which is adaptable to the polymer to which it is added.

By solid substrate or porous support is meant, preferably, an inorganic substrate which is solid at the conversion temperature of the polymeric materials and more particularly an inorganic oxide.

The inorganic oxide may be selected from silica, alumina, silica-alumina, sodium aluminosilicate, calcium silicate, magnesium silicate, zirconia, magnesium oxide, calcium oxide, cerium oxide or titanium oxide. The inorganic oxide may be fully or partly hydroxylated or carbonated.

Among these substrates, preference is given to those which can be dispersed in the thermoplastic material in the form of particles or aggregates of low diameter, advantageously to give dispersed particles having a diameter or size of less than 5 μm, and more advantageously still at least 80% by number of the dispersed particles have a diameter or size of less than 1 μm.

A dispersion of this kind is obtainable by mixing particles already exhibiting such size characteristics into the polymeric material or, more advantageously, by using granules or agglomerates of substrates formed by the agglomeration of particles or aggregates of which at least 80% have a diameter or a size of less than 1 μm. These granules or agglomerates, following addition to the polymeric material and under the action of the shearing forces which are applied in order to produce the dispersion, break down into aggregates or elementary particles thus enabling a very good dispersion of the flame retardant in the polymer or the polymeric material.

In this last embodiment, the agglomerates or granules preferably have a high specific surface area and a porosity between the important aggregates or elementary particles, in order to allow the flame-retardant compound to be adsorbed at least on the surface of the aggregates or particles. The aggregates or particles may likewise have a porosity which allows the flame-retardant compound or agent to be absorbed.

In this embodiment the diameter or average size of the granules or agglomerates is not critical and is advantageously selected so as to allow the flame-retardant composition to be handled readily, especially in the course of its addition to the polymeric material. Furthermore, the diameter or average size of these granules is likewise selected so as to facilitate the addition and adsorption of the flame-retardant compound: for example, to prevent sticking between the various granules.

By way of indication, granules with a mean diameter D50 of more than 60 μm, advantageously of between 80 μm and 300 μm, are preferred.

Among the inorganic substrates mentioned above, certain silicas exhibit these characteristics and are therefore particularly preferred.

Thus, certain silicas, having the property of undergoing dispersion in the form of particles or aggregates with a diameter or size of between 0.005 μm and 1 μm, will be preferred for the implementation of the present invention.

Furthermore, the inorganic substrates which are particularly suitable for the invention are those whose granules or agglomerates have a high porosity and a high specific surface area.

Accordingly preferred substrates are those whose granules have a total pore volume of at least 0.5 ml/g, preferably at least 2 ml/g. This pore volume is measured by the mercury porosimetry method using a Micromeritics Autopore III 9420 porosimeter, in accordance with the following technique:

The sample is dried for 2 hours in an oven at 200° C. beforehand. The measurements are subsequently carried out in accordance with the procedure described in the manual supplied by the manufacturer.

The pore diameters or pore sizes are calculated by means of the Washburn equation with a contact angle equal to 140° and a surface tension gamma of 485 dynes/cm.

Advantageously, the inorganic substrates or porous supports which have a pore volume of at least 0.50 ml/g for pores whose diameter or size is less than or equal to 1 μm are preferred.

According to one preferred embodiment of the invention the inorganic substrate is a silica, advantageously an amorphous silica. Silicas are obtained by various processes, including two main processes which lead to silicas referred to as precipitated silica and fumed silica. Silica may also be prepared in gel form.

Silicas having a specific surface area, measured in accordance with the CTAB method, of greater than 50 $m^2/g$ are preferred.

Precipitated silicas are preferred because they may be in the form of agglomerated particles forming granules with a size of at least 50 μm or greater than 150 μm.

They may be in the form of beads or granules which are substantially spherical, obtained for example by spraying, as described in European Patent No. 0018866. This silica is sold under a generic name of Micropearl. Silicas of this kind having significant properties of flowability, dispersibility and a high impregnation capacity are described in particular in European Patents 966207, 984773 and 520862 and in international applications WO95/09187 and WO95/09128.

Other types of silica may be suitable for the invention, such as those described in French Patent Application No. 01 16881, which are pyrogenic silicas, or silicas partially dehydroxylated by calcining or surface treatment.

These examples of silicas used as solid inorganic substrate are described only by way of indication and as preferred embodiments. It is also possible to use other silicas obtained by other processes and having porosity and dispersibility properties which are suitable for performing the invention.

According to the invention the flame retardant additive comprises a flame-retardant compound which is adsorbed on inorganic substrate particles. In one preferred embodiment of the invention this adsorption is obtained by impregnating granules or agglomerates. This impregnation is carried out by any conventional means and, for example, by mixing the substrate with the flame-retardant compound in the liquid state or in a form in which it is dispersed or in solution in a solvent. In this latter case the solvent will be removed, following impregnation of the substrate, by evaporation.

The term "flame retardant" or "flame-retardant compound" should be understood to refer to one or more flame-retardant compounds, or to a mixture of compounds forming a system which has flame retardancy properties.

The inorganic oxide is preferably precipitated silica, and may for example be a silica which is sold under the trade names Tixosil 38A, Tixosil 38D or Tixosil 365 by Rhodia.

The precipitated silica may be a highly dispersible silica, such as the silicas described in EP 520862, WO 95/09127 or WO 95/09128, thereby facilitating its dispersion in the polymer and having a positive effect on the mechanical properties of the material obtained. The silica in question may be, for example, a silica which is sold under the trade names Z1165 MP or Z1115 MP by Rhodia.

In particular the precipitated silica may be in the form of substantially spherical beads with an average size in particular of at least 80 microns, for example of at least 150 microns, which are obtained by means of a nozzle sprayer, as described for example in EP 0018866. The silica in question may be, for example, silica called Micropearl. This form allows the impregnation capacity and flowability of the powder to be optimized, as described for example in EP 966207 or EP 984772. The silica in question may be, for example, a Tixosil 38X or Tixosil 68 silica from Rhodia.

This makes it possible to use a gravimetric powder metering apparatus in order to introduce the resultant flame retardant powder, since this powder flows well and does not dust.

The amorphous silica may be a silica featuring low water regain. "Water regain" which corresponds to the quantity of water integrated into the sample, relative to the mass of the sample in the dry state, after 24 hours at 20° C. and 70% relative humidity. Low water regain refers to a water regain of less than 6% and preferably of less than 3%. The silicas in question may be precipitated silicas described in patent application FR 01 16881, filed on 26 Dec. 2001 by Rhodia, pyrogenic silicas or silicas partially dehydroxylated by calcining or by surface treatment.

The flame retardant of the invention is advantageously liquid at ambient temperature (approximately 25° C.). This liquid flame retardant may be selected from all of the liquid flame retardants which are known to the person skilled in the art, with the exception of orthophosphoric acid or of polyphosphoric acid.

Mention may be made in particular of liquid flame retardants based on phosphorus, such as phosphonic acids and their esters and salts, phosphoric esters or phosphinic acids and their esters and salts.

Use may be made in particular of liquid flame retardants which are viscous, which stick and/or which are difficult to handle or to clean.

A viscous liquid is any liquid which has a viscosity of more than 100 centipoises at a temperature of 25° C., preferably more than 1000 centipoises at a temperature of 25° C., and more preferably still more than 10000 centipoises at a temperature of 25° C., this viscosity being measured by a Brookfield-type apparatus with a spindle and a rotational speed which is adapted to the viscosity measured. For example, cylindrical spindle and a rotational speed of 50 rpm are used where the viscosity is in the region of 100 centipoises.

As flame-retardant compounds which are suitable for the invention mention may be made by way of example of methylbis(5-ethyl-2-methyl-2-oxido-1,2,3-dioxaphosphorinan-5-yl)methylphosphonic acid, alone or in a mixture with methyl (5-ethyl-2-methyl-2-oxido-1,3,2-dioxaphosphorinan-5-yl) methylphosphonic acid, resorcinol bis(diphenyl phosphate), bisphenol A bis(diphenyl phosphate), polyphosphate esters diethylphosphinic acid, ethylmethylphosphinic acid, methyl-n-propyl-phosphinic acid and mixtures, esters and salts thereof.

By way of illustration mention may be made of viscous liquids sold under the trade names Antiblaze 1045 (mixture of methylbis(5-ethyl-2-methyl-1,3,2-dioxaphosphorine)phosphonic acid and methyl(5-ethyl-2-methyl-2-oxido-1,3,2-dioxaphospho)phosphonic acid), which is sold by Rhodia and whose viscosity as indicated on the data sheets is 500 000 centipoises at 25° C. and 1000 centipoises at 110° C.; Fyrolflex RDP (resorcinol bis(diphenyl phosphate)), which is sold by Akzo and whose viscosity as indicated on the data sheets is 600 centipoises at 25° C.; and Fyrolflex BDP (bisphenol A bis(diphenyl phosphate)), which is sold by Akzo and whose viscosity as indicated on the data sheets is 12450 centipoises at 25° C.

By way of illustration mention may also be made of the compounds or compositions which are sold by Rhodia under the trade name Antiblaze CU or Antiblaze CT, which have a viscosity as indicated on the data sheets of 500 000 centipoises at 25° C. and 1000 centipoises at 110° C. and which contain the products present in Antiblaze 1045 in different proportions, the diphenyl phosphate ester derivatives sold by Akzo under the name Fyrolflex, whose viscosity as indicated on the data sheets is 12450 centipoises at 25° C., or by Great Lakes Chemical Corp. under the name Rheophos DP. Finally, Daihachi Chemical Industry sells polyphosphate esters under the names CR 741, CR 733 and CR 741S.

As indicated above, these compounds may be impregnated directly on the substrate, such as a silica for example, or may be dissolved in a solvent such as, for example, water, organic solvents such as ketones, alcohols, ethers, hydrocarbons, and halogenated solvents, for example.

It is preferred to use a liquid flame retardant. It may, however, be preferred, in order for example to avoid hot impregnation, to dissolve the flame retardant in a solvent. The solid substrate is then impregnated with the solution obtained. In this case it is possible to remove the solvent by drying.

Impregnation is preferably carried out dry; that is, the flame-retardant compound is added gradually to the solid substrate in order to allow total impregnation or adsorption. For that purpose it is necessary for the flame-retardant compound or the solution of the flame-retardant compound to have a sufficient fluidity. Thus in order to obtain this fluidity level the said impregnation or adsorption can be carried out at temperatures higher than the ambient temperature, within a range of between 20° C. and 200° C., preferably less than 100° C.

The solid substrate may also be preheated in the same temperature range in order to facilitate impregnation, particularly if the product needs to be fluidized by heating. The porous support or solid substrate may also be dried before impregnation, either by drying or by calcining, in order to remove the water present. This makes it possible to adapt the hydrophilic or hydrophobic nature of the surface of the porous support depending on the flame-retardant product to be impregnated.

Drying may be carried out by any of the conventional techniques known to the person skilled in the art.

Impregnation may take place in a single step or in two or more successive steps.

The amount of flame retardant impregnated or adsorbed may vary within large proportions. However, it is limited and at most equal to the amount necessary to fill the total pore volume of the inorganic substrate in the case where granules or agglomerates which exhibit porosity are impregnated. This is because the flame retardant additive which must be added to the polymeric material must preferably be a powder or a solid in the form of granules which exhibit good fluidity in order to allow this addition. In the case where particles or aggregates are impregnated the amount of flame-retardant compound added is determined so as to give an impregnated solid product which can be handled and added to the polymeric material. The concentration by weight of flame-retardant compound in the flame retardant composition is preferably between 20% and 70% relative to the weight of flame retardant composition, advantageously between 20% and 50%.

If the flame retardant is too viscous at ambient temperature to be impregnated it may be heated beforehand and hence the impregnation may be carried out hot.

The temperature range used for hot impregnation is between 30 and 300° C. The temperature used for hot impregnation is preferably between 50 and 100° C.

The inorganic oxide may also be preheated in the same temperature range in order to facilitate impregnation.

It is preferred to use a concentrated liquid flame retardant. It may be preferable, however, in order to avoid hot impregnation for example, to dilute the flame retardant in a solvent. In that case the inorganic oxide is impregnated with the solution obtained. It is possible in this case to remove the solvent from the impregnated inorganic oxide by drying.

Impregnation may take place in a single step or in two or more successive steps of impregnation.

The flame retardant additive may be present in the form of a powder, which can be shaped in accordance with the shaping methods commonly employed in industry.

The present invention further provides for the use of the above-described flame-retardant composition for flame retarding various materials, especially polymers, such as thermoplastic polymers, thermosetting polymers and elastomers.

When the polymer or copolymer is thermoplastic it may be a polymer selected from polyamides, polycarbonates, polyesters, styrenic polymers, acrylic polymers, polyolefins, polyvinyl chlorides and derivatives thereof, polyphenyl ethers, polyurethanes or mixtures thereof.

When the polymer is a thermoplastic or thermosetting polyamide it is selected from the group consisting of polyamides obtained by polycondensation of a linear dicarboxylic acid with a linear or cyclic diamine, such as PA 6.6, PA 6.10, PA 6.12, PA 12.12, PA 4.6, MXD 6, or of an aromatic dicarboxylic acid and a linear or aromatic diamine, such as polyterephthalamides, polyisophthalamides, polyaramides, polyamides obtained by polycondensation of an amino acid with itself, it being possible for the amino acid to be generated by the hydrolytic opening of a lactam ring, such as, for example PA 6, PA 7, PA 11, PA 12. It is also possible to use copolyamides derived in particular from the above polyamides, or mixtures of these polyamides or copolyamides.

Branched polyamides and star polyamides can also be used.

Preferred polyamides are polyhexamethyleneadipamide, polycaprolactam, or copolymers and mixtures of polyhexamethyleneadipamide with polycaprolactam.

When the polymer is a polyester it may be, for example, polybutylene terephthalate, polypropylene terephthalate or polyethylene terephthalate or mixtures thereof.

When the polymer is a styrenic polymer it may be, for example, polystyrene, styrene-butadiene (SB), polystyrene-acrylonitrile (SAN), acrylonitrile-butadiene-styrene (ABS), or copolymers thereof or mixtures thereof.

When the polymer or copolymer is a polyolefin it may be selected for example from polypropylene, polyethylene, ethylene/vinyl acetate (EVA) copolymer or mixtures thereof.

When the polymer is thermosetting it may be a polymer selected from polyurethane, epoxy resins (such as Araldite), polyester resins, phenolic resins (such as Bakelite) or amino resins (such as Formica).

When the flame-retardant composition of the invention is added to thermoplastic polymers (including thermoplastic elastomers) it is incorporated by mixing, preferably in a single-screw or twin-screw extruder. The mixture is extruded in the form of articles such as profiles or, more advantageously, in the form of strands which will be cut into granules. The granules are used in processes for producing articles, as a raw material, and will be melted in order to supply the flame-retarded composition in shaping processes such as processes of moulding by injection, extrusion, extrusion blow moulding or the like.

The mixture may further comprise one or more additives which are commonly employed in this field.

The total amount of flame-retardant composition according to the invention that is used varies between 1 to 50% relative to the total weight of the mixture obtained. The total amount of flame-retardant composition is preferably between 10 to 40% relative to the total weight of the mixture obtained. More preferably still the total amount of flame-retardant composition is between 15 to 30% relative to the total weight of the mixture obtained.

When the inorganic oxide impregnated with liquid flame retardant is incorporated into thermosetting polymers the inorganic oxide impregnated with liquid flame retardant and the other additives are incorporated into one of the monomers or oligomers before the polymerization or crosslinking reaction. The amounts of inorganic oxide impregnated with liquid flame retardant that are used are in the same proportions as those described for the thermoplastic polymers.

It is possible additionally to add all of the additives which are generally employed for the production of compositions which are used, for example, for manufacturing moulded articles in particular in the electrical field.

By way of example mention may be made of fillers, including reinforcing fillers, heat or light stabilizer additives, additives which enhance impact resistance, pigments and dyes. This list is not at all limitative in nature.

Other aspects and advantages of the products which are the subject of the invention will emerge on reading the examples given below by way of illustration and in no way limitative.

A-Preparation Examples of a Highly Porous Silica Impregnated with a Concentrated Liquid Flame Retardant According to the Invention

EXAMPLE 1

Preparation of a Highly Porous Silica Impregnated with Antiblaze 1045

The highly porous silica used is a silica called Tixosil 38A from Rhodia, having a total pore volume of 4.2 ml/g and a useful volume of 2.2 ml/g.

The amount of concentrated Antiblaze used for impregnation corresponds to the maximum amount which can be impregnated onto the silica, in other words the volume for which saturation of the silica is obtained. Impregnation takes place dry. Antiblaze 1045, heated to 80° C. beforehand in order to make it more fluid, is added dropwise from a burette in portions of 25 ml. 25 grams of silica are weighed out. The maximum impregnated volume attained is 50 ml of Antiblaze 1045, equivalent to 63 g.

The end product is therefore composed of 71.6% by weight of Antiblaze 1045 and 28.4% of silica.

The product is in the form of a powder whose diameter (D50) from the particle size distribution is 250 μm (D50, in the field of powder granulometry, is the particle diameter or size for which 50% by weight of the particles have a lower diameter and 50% by weight have a higher diameter).

The phosphorus content of this powder is 15%.

EXAMPLE 2

Preparation of a Highly Porous Silica Impregnated with Antiblaze 1045

The highly porous silica used is a silica called Tixosil 38X from Rhodia which has a total pore volume of 3.6 ml/g and a useful pore volume of 2.0 ml/g. It is a silica called Micropearl which possesses excellent flowability and does not dust.

3.5 kg of silica are weighed out and introduced into a jacketed 20-liter Lödige mixer. The silica is heated to 95° C. (the setpoint temperature of the thermostatic bath is 135° C.).

Beforehand, Antiblaze 1045 was placed in an oven at 80° C. overnight. It is subsequently pumped into a jacketed feed vessel thermostated at 99° C. and is introduced into the Lödige without spraying (introduction flow rate: 45 min at 4.1 l/h and 1 h 30 min at 1.9 l/h).

The rotational speed of the ploughshare in the Lödige is 70 rpm.

The total amount of Antiblaze 1045 introduced into the silica is 6.696 kg (equivalent to 5314 ml).

The end product is subsequently screened on a 1.25 mm sieve.

The end product is therefore composed of 65.6% by weight of Antiblaze 1045 and 34.4% of silica.

It is in the form of a powder which possesses excellent flowability, similar to that of the initial Micropearl silica Tixosil 38X, with no dusting by the product, whose diameter (D50) from the particle size distribution is 250 μm.

The phosphorus content of this powder is 13.6%.

EXAMPLE 3

Preparation of a Highly Porous Silica Impregnated with Fyrolflex RDP

The highly porous silica used is a silica called Tixosil 38A from Rhodia, having a total pore volume of 4.2 ml/g and a useful pore volume of 2.2 ml/g.

The amount of concentrated Fyrolflex RDP used for impregnation corresponds to the maximum amount which can be impregnated onto the silica, in other words the volume for which saturation of the silica is obtained. Impregnation takes place dry. Fyrolflex RDP, which is at ambient temperature is added dropwise from a burette in portions of 25 ml.

25 grams of silica are weighed out. The maximum impregnated volume attained is 50 ml of Fyrolflex RDP, equivalent to 65 g.

The end product is therefore composed of 72.2% by weight of Fyrolflex RDP and 27.8% of silica.

The product is in the form of a powder whose diameter (D50) from the particle size distribution is 60 μm. The powder thus obtained has a particle size which is much lower than the Tixosil 38A silica starting product. The impregnation with Fyrolflex RDP therefore leads to a powder which has poorer dusting and flowability properties than the non-impregnated silica.

The phosphorus content of this powder is 7.6%.

EXAMPLE 4

Preparation of a Highly Porous Silica Impregnated with Antiblaze CU

The highly porous silica used is a silica called Tixosil 38X from Rhodia which has a total pore volume of 3.6 ml/g and a useful pore volume of 2.0 ml/g. It is a silica called Micropearl which possesses excellent flowability and does not dust.

3.5 kg of silica are weighed out and introduced into a jacketed 20-liter Lödige mixer. The silica is heated to 95° C. (the setpoint temperature of the thermostatic bath is 135° C.).

Beforehand, Antiblaze CU was placed in an oven at 80° C. overnight. It is subsequently pumped into a jacketed feed vessel thermostated at 99° C. and is introduced into the Lödige without spraying (introduction flow rate: 45 min at 4.1 l/h and 1 h 30 min at 1.9 l/h).

The rotational speed of the ploughshare in the Lödige is 70 rpm.

The total amount of Antiblaze CU introduced into the silica is 6.696 kg (equivalent to 5314 ml).

The end product is subsequently screened on a 1.25 mm sieve.

The end product is therefore composed of 65.6% by weight of Antiblaze CU and 34.4% of silica.

It is in the form of a powder which possesses excellent flowability, similar to that of the initial Micropearl silica Tixosil 38X, with no dusting by the product, whose diameter (D50) from the particle size distribution is 250 μm.

The phosphorus content of this powder is 13.5%.

B-Preparation of Flame-retardant Polymeric Compositions

B-1 Polyamide

The flame-retardant products obtained in Example 1 and in Example 2 are incorporated into a polymeric matrix of polyamide 6 and polyamide 66 in melted medium with the aid of a single-screw or twin-screw extruder. The mixture is extruded generally in the form of strands which are cut in order to give granules.

These granules are used as raw material for supplying processes for manufacturing flame-retarded moulded articles by injection, moulding, extrusion blow moulding or by any other process for shaping articles. The properties of these compositions are measured on the basis of test specimens obtained by injection moulding a polyamide composition additized with the powder of Example 2 in accordance with the procedure described below:

B-1-1 Preparation of Flame-retarded Polyamide 6 (PA6) Test Specimens

Preparation of Granules

A polyamide 6 composition containing 20% of glass fibres is extruded in a Leistritz twin-screw extruder with a flow rate of between 6 and 7 kg/hour, imposing a temperature profile of 250° C. on average and a pressure in the degassing zone of approximately 400 mbar. The melt pressure measured at the die is in the region of 8 bar.

The product obtained at the end of the preparation described in Example 2 is added with the aid of a gravimetric powder metering apparatus at a rate which is determined so as to give a proportion of product in the polymer of 20% by weight relative to the end composition. The strands obtained are cut into granules.

The good flowability of the powder allows standard metering systems to be used without any difficulty and in particular without dusting.

Preparation of Test Specimens

The test specimens are obtained by injection moulding the granules obtained above under standard conditions on an 85-tonne Billon press with a cycle time of 40 seconds, a mould temperature of 80° C. and a temperature profile imposed on the sleeve of 250° C. The test specimens obtained are of standardized shape for the implementation of the UL-94 test for determining flame retardancy properties. Test specimens with a thickness of 1.6 mm and 0.8 mm were produced.

B-1-2 Preparation of Additized Polyamide 66 (PA66) Test Specimens

Preparation of Granules

A polyamide 66 composition containing 20% of glass fibres is extruded in a Leistritz twin-screw extruder with a flow rate of between 6 and 7 kg/hour, imposing a temperature profile in the screw of 280° C. on average and a pressure in the degassing zone of approximately 400 mbar. The melt pressure measured at the die is in the region of 8 bar.

In a first experiment the product of Example 2 and in a second experiment the product of Example 4 are added with the aid of a gravimetric powder metering apparatus at a rate which is determined so as to give a proportion of product in the polymer of 20% by weight relative to the end composition.

The good flowability of the powder allows standard metering systems to be used without any difficulty and in particular without dusting.

The strand obtained is cut into granules in a customary fashion.

Preparation of Test Specimens

The test specimens are obtained by injection moulding the granules obtained above under standard conditions on an 85-tonne Billon press with a cycle time of 40 seconds, a mould temperature of 80° C. and a temperature profile imposed on the sleeve of 280° C. so as to give test specimens with a thickness of 1.6 mm and 0.8 mm with a form which is standardized for carrying out the UL-94 test.

B-1-3 Preparation of Additized Polyamide 66 (PA66) Test Specimens

Preparation of Granules

A polyamide 66 composition containing 20% of glass fibres is extruded in a Leistritz twin-screw extruder with a flow rate of between 6 and 7 kg/hour, imposing a temperature profile in the screw of 280° C. on average and a pressure in the degassing zone of approximately 400 mbar. The melt pressure measured at the die is in the region of 8 bar.

The product of Example 3 is added with the aid of a gravimetric powder metering apparatus at a rate which is determined so as to give a proportion of product in the polymer of 20% by weight relative to the end composition.

The good flowability of the powder allows standard metering systems to be used without any difficulty and in particular without dusting.

The strand obtained is cut into granules in a customary fashion.

Preparation of Test Specimens

The test specimens are obtained by injection moulding the granules obtained above under standard conditions on an 85-tonne Billon press with a cycle time of 40 seconds, a mould temperature of 80° C. and a temperature profile imposed on the sleeve of 280° C. so as to give test specimens with a thickness of 1.6 mm and 0.8 mm. This injection moulding was not carried out properly because the injection screw became blocked. The reason for this blockage may be a problem of plastification of the Polyamide which may be due to low affinity between the Fyrolflex RDP, which has a hydrophobic character, and the silica, which has a surface with a hydrophilic character.

2) Determination of the Fire Behaviour of the Polyamide Test Specimens

The fire behaviour of the samples obtained above is determined according to the UL-94 test written by Underwriters Laboratories and described in Standard ISO 1210:1992(F). This test is carried out with test specimens having a thickness of 1.6 mm and 0.8 mm.

The results obtained for the test specimens obtained above are collated in table I below. Before the UL-94 test is carried out the test specimens are conditioned by keeping them in an atmosphere having a relative degree of humidity of 50% at 23° C. for 48 hours.

TABLE I

| Conditioning | Classification | |
|---|---|---|
| Test specimen thickness (mm) | 1.6 | 0.8 |
| PA66 20% GF | V2 | NC |
| PA66 20% GF + 20% product of Example 2 | V0 | V1 |
| PA66 20% GF + 20% product of Example 4 | V0 | V0 |
| PA63 20% GF | NC | NC |
| PA63 20% GF + 20% product of Example 2 | V2 | V2 |

GF signifies glass fibre

These tests show that the product obtained at the end of the preparation described in Example 2 imparts satisfactory flame retardance properties to the polyamide. A V0 classification in fact is obtained for a thickness of 1.6 mm for the polyamide 66, and flame retardancy performances are obtained which are substantially improved for the polyamide 6 by comparison with the same polyamide 6 tested without this additive.

The compositions flame retarded with the powder of Example 3 were not tested, since it was impossible to produce proper test specimens.

B-2 Polypropylene

1) Preparation of Polypropylene (PP) Test Specimens

Two Formulas are Prepared:

Formula 1:

Polypropylene alone is ground at 200 rpm for 3 minutes at 155° C.

Subsequently 18% by weight of the powder corresponding to Example 1, relative to the total weight of the mixture, 6% by weight of pentaerythritol relative to the total weight of the mixture and 6% by weight of melamine relative to the total weight of the mixture are introduced into the mixer and grinding is continued for 3 minutes.

Formula 2:

Polypropylene alone is ground at 200 rpm for 3 minutes at 155° C. Subsequently 20% by weight of the powder corresponding to Example 1, relative to the total weight of the mixture, is introduced into the mixer and grinding is continued for 3 minutes.

These formulas are then moulded by thermal compression at a temperature of 190° C. at 1 bar for 4 minutes and then at 100 bars for 1 minute and at 200 bars for 1 minute, followed by cooling for 4 minutes, during which this pressure of 200 bars is maintained.

Using the appropriate moulds, this thermal compression process gives bars for the fire behaviour tests of type UL-94 (thickness: 3.2 mm).

2) Determination of the Fire Behaviour of the Test Specimens

The fire behaviour of the samples obtained with the two formulas is determined in accordance with the UL-94 test according to the Underwriters Laboratories procedure described in Standard ISO 1210:1992 (F).

The results obtained with the bars containing formulas 1 and 2 are collated in table II below.

TABLE II

| Thickness of UL samples (mm) | 3.2 |
|---|---|
| PP alone | NC |
| Formula 1 | V2 |
| Formula 2 | V2 |

These tests show that the product corresponding to Example 1 imparts satisfactory combustion properties to polypropylene, particularly when this product is introduced alone into polypropylene (formula 2), since a V2 classification is obtained (NC for polypropylene alone) for a level of additive of 20%.

The addition of pentaerythritol and of melamine in addition to the product corresponding to Example 1 to the polypropylene (formula 1) gives a classification which remains correct (V2 as against NC for polypropylene alone) but at a higher overall level of additives.

The advantage of the product corresponding to Example 1 as a flame retardant which significantly enhances the fire retardancy performance of polypropylene is therefore evident.

The invention claimed is:

1. A flame-retardant composition comprising a flame retardant organophosphorus compound impregnated on a porous solid inorganic oxide support presenting a hydrophilic or hydrophobic surface, wherein the inorganic oxide is an amorphous, synthetic, and precipitated silica having a total pore volume of at least 0.5 ml/g and being in powder form composed of porous granules or agglomerates or beads having a mean diameter (D50) of greater than or equal to 60 μm, the organophosphorus compound having a hydrophilic or hydrophobic nature similar to said surface of the porous support.

2. The composition according to claim 1, wherein the inorganic oxide has a total pore volume of at least 2 ml/g.

3. The composition according to claim 1, wherein the granules or agglomerates are composed of an agglomeration of particles or aggregates of which at least 80% by number have a diameter of less than 1 μm.

4. The composition according to claim 1, wherein the granules or agglomerates have a porosity of at least 0.5 ml/100 g.

5. The composition according to claim 1, wherein the precipitated silica is in the form of substantially spherical beads with a mean diameter (D50) of at least 80 μm.

6. The composition according to claim 5, wherein the mean diameter (D50) is of at least 150 microns.

7. The composition according to claim 1, wherein the silica is a highly dispersible silica.

8. The composition according to claim 1, wherein the organophosphorus compound is liquid at ambient temperature.

9. The composition according to claim 1, wherein the organophosphorus compound is a phosphonic acid, a salt thereof or an ester thereof, a phosphoric ester, a phosphinic acid, a salt thereof or an ester thereof.

10. The composition according to claim 9, wherein the organophosphorus compound is methylbis(5-ethyl-2-methyl-2-oxido-1,2,3-dioxaphosphorinan-5-yl)methylphosphonic acid, a mixture of methylbis(5-ethyl-2-methyl-2-oxido-1,2,3-dioxaphosphorinan-5-yl)methylphosphonic acid with methyl (5-ethyl-2-methyl-2-oxido-1,3,2-dioxaphosphorinan-5-yl)methylphosphonic acid, resorcinol bis (diphenyl phosphate), bisphenol A bis(diphenyl phosphate), polyphosphate esters diethyl-phosphinic acid, ethylmethyl-phosphinic acid, methyl-n-propyl-phosphinic acid, an ester thereof or a salt thereof.

11. The composition according to claim 1, wherein the flame retardant organophosphorus compound has a weight concentration of between 20 and 70% relative to the weight of the composition.

12. A process for producing a composition having flame retardancy properties as defined in claim 1, comprising the step of impregnating the flame retardant on the porous support by a dry impregnation.

13. The process according to claim 12, wherein the flame retardant is a viscous liquid.

14. The process according to claim 13, wherein the viscosity of the flame retardant is greater than or equal to 100 centipoises at 25° C.

15. The process according to claim 14, wherein the viscosity of the flame retardant is greater than or equal to 1000 centipoises at 25° C.

16. The process according to claim 15, wherein the viscosity of the flame retardant is greater than or equal to 10000 centipoises at 25° C.

17. A process for carrying out a flame retardancy treatment on polymers, comprising the step of incorporating by mixing a composition as defined in claim 1, in said polymers.

18. The process according to claim 17, wherein the polymers are thermosetting polymers, thermoplastic polymers or elastomers.

19. The process according to claim 18, wherein the thermoplastic polymers are polyolefins, polyamides or polyesters.

20. The process according to claim 19 wherein the polyolefin is polypropylene.

21. The process according to claim 19, wherein the polyamide is polyamide 6, polyamide 66, branched polyamides, star polyamides, polyamide 12, polyamide 11 or a mixture thereof.

\* \* \* \* \*